US011951734B2

(12) United States Patent
Otokita et al.

(10) Patent No.: US 11,951,734 B2
(45) Date of Patent: Apr. 9, 2024

(54) RECORDING DEVICE AND RECORDING METHOD

(71) Applicant: SEIKO EPSON CORPORATION, Tokyo (JP)

(72) Inventors: Kenji Otokita, Higashichikuma-Gun Yamagata-Mura (JP); Nobuyuki Hayasaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 67 days.

(21) Appl. No.: 17/822,820

(22) Filed: Aug. 29, 2022

(65) Prior Publication Data

US 2023/0066383 A1 Mar. 2, 2023

(30) Foreign Application Priority Data

Aug. 31, 2021 (JP) ................................ 2021-141021

(51) Int. Cl.
*B41J 11/00* (2006.01)
*B41F 23/00* (2006.01)
*H01T 19/00* (2006.01)

(52) U.S. Cl.
CPC ......... *B41J 11/00212* (2021.01); *B41F 23/00* (2013.01); *B41J 11/00214* (2021.01); *B41J 11/00218* (2021.01); *H01T 19/00* (2013.01)

(58) Field of Classification Search
CPC ............ B41J 11/00212; B41J 11/00214; B41J 11/00218; B41J 2/16547; B41J 25/304; B41J 2/16508; B41J 2/2114; B41J 2/2117; B41J 2002/16573; B41J 2025/008; B41J 2/16585; B41J 11/0015; B41F 23/00; H01T 19/00; H01T 23/00
See application file for complete search history.

(56) References Cited

U.S. PATENT DOCUMENTS 10,093,116 B2 * 10/2018 Toyama .................. B41J 15/16

FOREIGN PATENT DOCUMENTS

JP 2017-196745 A 11/2017

* cited by examiner

*Primary Examiner* — Bradley W Thies
(74) *Attorney, Agent, or Firm* — WORKMAN NYDEGGER

(57) ABSTRACT

A recording device, when recording is performed on a predetermined type target recording medium stored in a storage unit, drives a surface potential adjustment unit so that a surface potential is a positive potential within a predetermined range. By configuring such a recording device, it is possible to suppress adhesion of ink to an ejecting unit, and occurrence of an ink ejection failure can be suppressed.

9 Claims, 9 Drawing Sheets

S1

S2

S3

RECORDING DEVICE AND RECORDING METHOD

The present application is based on, and claims priority from JP Application Serial Number 2021-141021, filed Aug. 31, 2021, the disclosure of which is hereby incorporated by reference herein in its entirety.

BACKGROUND

1. Technical Field

The present disclosure relates to a recording device and a recording method.

2. Related Art

In the past, various recording devices have been used to perform recording by ejecting ink from an ejecting unit onto a target recording medium. For example, JP 2017-196745 A discloses a printing apparatus that includes a corona processor that applies corona discharge to a surface of a recording medium to modify the surface of the recording medium, and ejects an ultraviolet curable ink from an ejecting head to the roll-shaped recording medium to form an image.

There are various types of target recording media, for example, such as a target recording medium made of resin. When recording is performed on a target recording medium wound in a roll shape among such target recording media made of resin, and the target recording medium wound in a roll shape is peeled from a roll, an inner back surface is charged to have a negative potential due to peeling charging, and an outer surface is charged to have a positive potential accordingly, in some cases. For example, a main dot of ink ejected from an ejecting unit of an ink jet head coupled to a ground (GND) is charged to have a negative potential, and a satellite dot generated accompanying the main dot is charged to have a positive potential. Here, when the surface of the target recording medium is charged to have a positive potential, since the satellite dot is charged to have a positive potential, force acts that is repulsive with respect to the surface of the target recording medium, and the satellite dot may adhere to the ejecting unit. When the satellite dot adheres to the ejecting unit, the satellite dot may be fixed to cause an ejection failure. It is conceivable that, this is because a radical is present on the surface of the target recording medium in association with applying corona discharge, and the radical on the surface of the target recording medium reacts with the satellite dot adhering to the ejecting unit, to produce an adhesive of the satellite dot that does not redissolve. Note that, the satellite dot is likely to cause an ejection failure particular when adhering to a vicinity of a nozzle of the ejecting unit.

Here, the printing apparatus of JP 2017-196745 A includes an ionizer, and is capable of supplying a negative ion to a surface of a recording medium, to neutralize the surface of the recording medium in terms of potential. Therefore, it is possible to reduce adhesion of the satellite dot to the ejecting unit. However, in association with ejection of the ink from the ejecting head, ink mist, which is a minute dot, may be generated in addition to the main dot and the satellite dot.

As a result of diligent studies, the present inventors found that, when the satellite dot adheres to the ejecting unit, the satellite dot may adhere to the vicinity of the nozzle of the ejecting unit, but easily adheres to a part other than the vicinity of the nozzle such as a space between nozzle rows, and accumulates, which may cause the ink to drip on the surface of the target recording medium, but the satellite dot is not particularly likely to adhere to the vicinity of the nozzle of the ejecting unit. On the other hand, as a result of diligent research, the present inventors found that, when the ink mist adheres to the ejecting unit, the ink mist easily adheres to the vicinity of the nozzle of the ejecting unit. Here, the ink mist of the ink ejected from the ejecting unit of the ink jet head coupled to the ground (GND) is also charged to have a negative potential. Of course, even when the ink mist adheres to the ejecting unit, the ink mist may cause an ejection failure, as well as when the satellite dot adheres to the ejecting unit. In other words, the present inventors found that the ink mist more easily adheres to the vicinity of the nozzle of the ejecting unit than the satellite dot, and the ink mist adhering to the vicinity of the nozzle of the ejecting unit may be a primary cause of an ejection failure. Since it is not that the ink mist is attracted particularly by the target recording medium in which a potential of the surface is neutralized, the ink mist adheres not only to the surface of the recording medium, but also to the ejecting head in the printing apparatus of JP 2017-196745 A, and thus an ejection failure may occur also in the printing apparatus of JP 2017-196745 A.

SUMMARY

A recording device of the present disclosure for solving the above-described problems includes a transport unit configured to transport a target recording medium, a corona irradiation unit disposed in a transport path of the target recording medium, and configured to apply corona discharge to a surface of the target recording medium to modify the surface, an ejecting unit disposed downstream of the corona irradiation unit in the transport path, and configured to eject an ultraviolet curable ink onto the surface, a surface potential adjustment unit disposed between the corona irradiation unit and the ejecting unit in the transport path, and configured to adjust a surface potential being a potential of the surface, a control unit configured to control driving of the transport unit, the corona irradiation unit, the ejecting unit, and the surface potential adjustment unit, and a storage unit configured to store a predetermined type target recording medium being a predetermined type of the target recording medium, wherein the control unit, when recording is performed on the predetermined type target recording medium stored in the storage unit, controls driving of the surface potential adjustment unit such that the surface potential is a positive potential within a predetermined range.

Additionally, a recording method of the present disclosure for solving the above-described problems is a recording method performable using a recording device that includes a transport unit transporting a target recording medium, a corona irradiation unit disposed in a transport path of the target recording medium, and applying corona discharge to a surface of the target recording medium to modify the surface, an ejecting unit disposed downstream of the corona irradiation unit in the transport path, and ejecting an ultraviolet curable ink onto the surface, a surface potential adjustment unit disposed between the corona irradiation unit and the ejecting unit in the transport path, and adjusting a surface potential being a potential of the surface, and a storage unit storing a predetermined type target recording medium being a predetermined type of the target recording medium, the recording method including driving the surface potential adjustment unit such that the surface potential is a positive potential within a predetermined range, when recording is performed on the predetermined type target recording medium stored in the storage unit.

DESCRIPTION OF EXEMPLARY EMBODIMENTS

Figure 1:
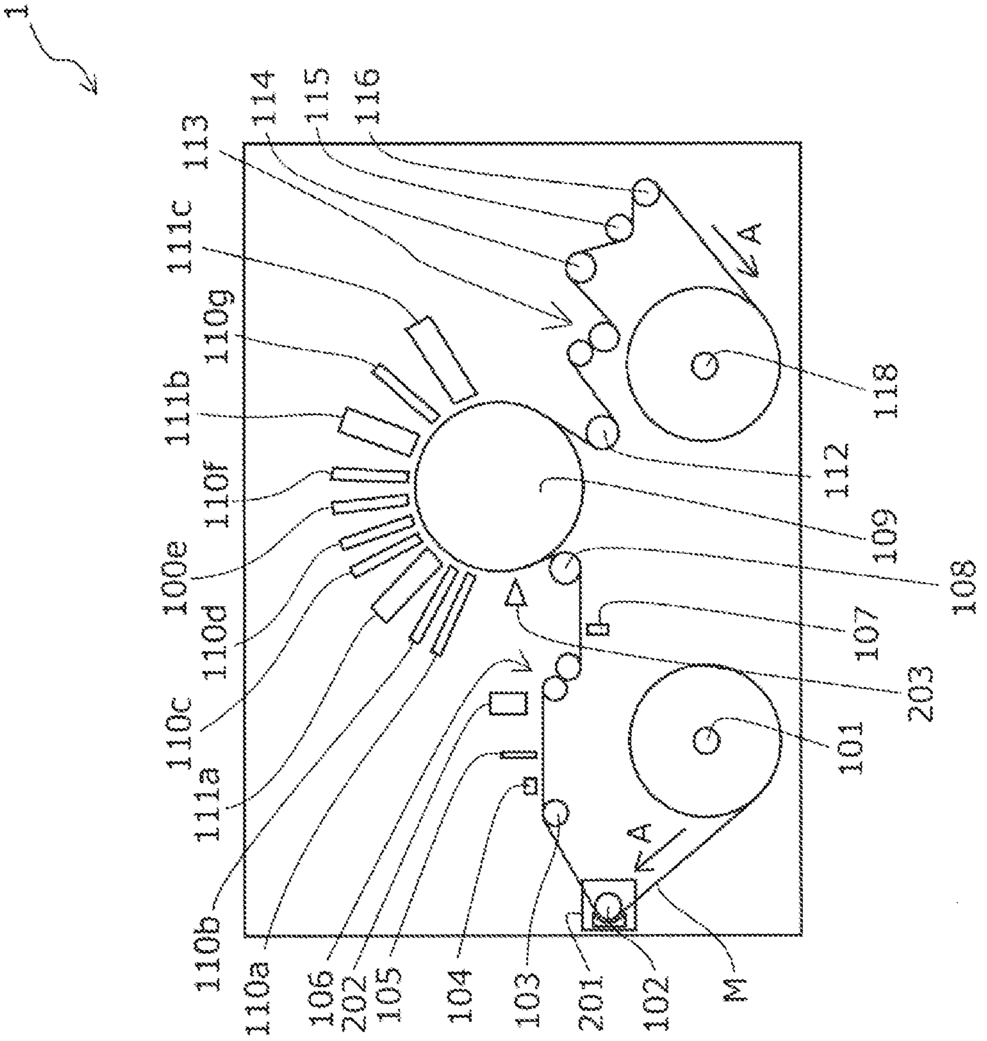
FIG. 1 is a schematic diagram of a recording device according to a working example of the present disclosure.

First, the present disclosure will be schematically described.

A recording device of a first aspect of the present disclosure for solving the above-described problems includes a transport unit configured to transport a target recording medium, a corona irradiation unit disposed in a transport path of the target recording medium, and configured to apply corona discharge to a surface of the target recording medium to modify the surface, an ejecting unit disposed downstream of the corona irradiation unit in the transport path, and configured to eject an ultraviolet curable ink onto the surface, a surface potential adjustment unit disposed between the corona irradiation unit and the ejecting unit in the transport path, and configured to adjust a surface potential being a potential of the surface, a control unit configured to control driving of the transport unit, the corona irradiation unit, the ejecting unit, and the surface potential adjustment unit, and a storage unit configured to store a predetermined type target recording medium being a predetermined type of the target recording medium, wherein the control unit, when recording is performed on the predetermined type target recording medium stored in the storage unit, controls driving of the surface potential adjustment unit such that the surface potential is a positive potential within a predetermined range.

According to the present aspect, when recording is performed on the predetermined type target recording medium, the surface potential adjustment unit is driven so that the surface potential is a positive potential within the predetermined range. In other words, even when minute ink mist is generated in association with ejection of the ink, the surface potential of the target recording medium is adjusted so that the ink mist is easily attracted by and heading to the surface of the target recording medium, that is, the ink mist is less likely to adhere to the ejecting unit. As a result, it is possible to suppress occurrence of an ink ejection failure caused by reaction of a radical generated by applying corona discharge to the surface of the target recording medium by the corona irradiation unit with the ink adhering to the ejecting unit.

A recording device of a second aspect of the present disclosure is the above first aspect, that includes a surface potential measurement unit configured to measure the surface potential, wherein the control unit controls driving of the surface potential adjustment unit based on a measurement result of the surface potential measurement unit.

According to the present aspect, the surface potential adjustment unit is driven based on the measurement result of the surface potential measurement unit. Thus, the surface potential can be precisely set to a positive potential within the predetermined range, based on the measurement result of the surface potential measurement unit.

A recording device according to a third aspect of the present disclosure is the second aspect that includes a rotating body configured to rotate while supporting the target recording medium over a range including a position facing the ejecting unit, wherein the surface potential measurement unit is disposed at a position facing the rotating body, the position being upstream of the ejecting unit in a transport direction of the target recording medium.

According to the present aspect, the surface potential measurement unit is disposed at the position facing the rotating body, the position being upstream of the ejecting unit in the transport direction of the target recording medium. Therefore, the surface potential can be measured immediately before the ink is ejected from the ejecting unit, and, the surface potential can be particularly precisely set to a positive potential within the predetermined range.

A recording device of a fourth aspect of the present disclosure is the first aspect, wherein the storage unit stores associated data corresponding to the predetermined type target recording medium so that the surface potential is a positive potential within the predetermined range, and the control unit controls driving of the surface potential adjustment unit based on the data.

According to the present aspect, the storage unit stores the associated data corresponding to the predetermined type target recording medium so that the surface potential is a positive potential in the predetermined range, and the control unit controls the driving of the surface potential adjustment unit based on the data. Thus, the surface potential can be easily set to a positive potential within the predetermined range based on the data.

A recording device of a fifth aspect of the present disclosure is any one of the first to fourth aspects, wherein a positive potential within the predetermined range is from 150 v to 400 v.

According to the present aspect, a positive potential within the predetermined range is from 150 v to 400 v. With such a range, it is possible to effectively suppress occurrence of an ink ejection failure.

A recording device of a sixth aspect of the present disclosure is any one of the first to fifth aspects, that includes a maintenance unit configured to maintain the ejecting unit, wherein the control unit controls the maintenance unit to set a maintenance interval by the maintenance unit when recording is performed on the predetermined type target recording medium stored in the storage unit to be shorter than a maintenance interval by the maintenance unit when recording is performed on the target recording medium other than the predetermined type target recording medium.

According to the present aspect, the maintenance unit is controlled to set the maintenance interval by the maintenance unit when recording is performed on the predetermined type target recording medium stored in the storage unit to be shorter than the maintenance interval by the maintenance unit when recording is performed on the target recording medium other than the predetermined type target recording medium. By driving the surface potential adjustment unit to set the surface potential to a positive potential within the predetermined range, a positively charged satellite dot may adhere to the ejecting unit and accumulate, and ink due to the satellite dot may drip on the target recording medium, but it is possible to reduce the possibility that the ink due to such a satellite dot drips on the target recording medium, by shortening the maintenance interval.

A recording device of a seventh aspect of the present disclosure is any one of the first to sixth aspects, wherein the predetermined type target recording medium is a target recording medium made of resin containing resin as a material.

According to the present aspect, the predetermined type target recording medium is a target recording medium made of resin containing resin as a material. Peel charging is likely to occur in the target recording medium made of resin, and a surface thereof is likely to be charged, but it is possible to effectively suppress occurrence of an ink ejection failure even when the target recording medium made of resin is used, by using the target recording medium made of resin as the predetermined type target recording medium.

A recording device of an eighth aspect of the present disclosure is the seventh aspect, wherein the predetermined type target recording medium contains at least any one of polyethylene terephthalate, polyethylene, and polypropylene as a material.

According to the present aspect, the predetermined type target recording medium contains at least any one of polyethylene terephthalate, polyethylene, and polypropylene as a material. In a target recording medium containing at least any one of polyethylene terephthalate, polyethylene, and polypropylene as a material, peel charging is particularly easily occurs, and particularly a surface thereof is easily charged, but by using a target recording medium containing at least any one of polyethylene terephthalate, polyethylene, and polypropylene as a material as the target recording medium made of resin, it is possible to effectively suppress occurrence of an ink ejection failure even when the target recording medium is used.

A recording method of a ninth aspect of the present disclosure is a recording method performable using a recording device that includes a transport unit transporting a target recording medium, a corona irradiation unit disposed in a transport path of the target recording medium, and applying corona discharge to a surface of the target recording medium to modify the surface, an ejecting unit disposed downstream of the corona irradiation unit in the transport path, and ejecting an ultraviolet curable ink onto the surface, a surface potential adjustment unit disposed between the corona irradiation unit and the ejecting unit in the transport path, and adjusting a surface potential being a potential of the surface, and a storage unit storing a predetermined type target recording medium being a predetermined type of the target recording medium, the recording method including driving the surface potential adjustment unit such that the surface potential is a positive potential within a predetermined range, when recording is performed on the predetermined type target recording medium stored in the storage unit.

According to the present aspect, when recording is performed on the predetermined type target recording medium, the surface potential adjustment unit is driven so that the surface potential is a positive potential within the predetermined range. As a result, it is possible to suppress occurrence of an ink ejection failure caused by reaction of a radical generated by applying corona discharge to the surface of the target recording medium by the corona irradiation unit with the ink adhering to the ejecting unit.

Figure 2:
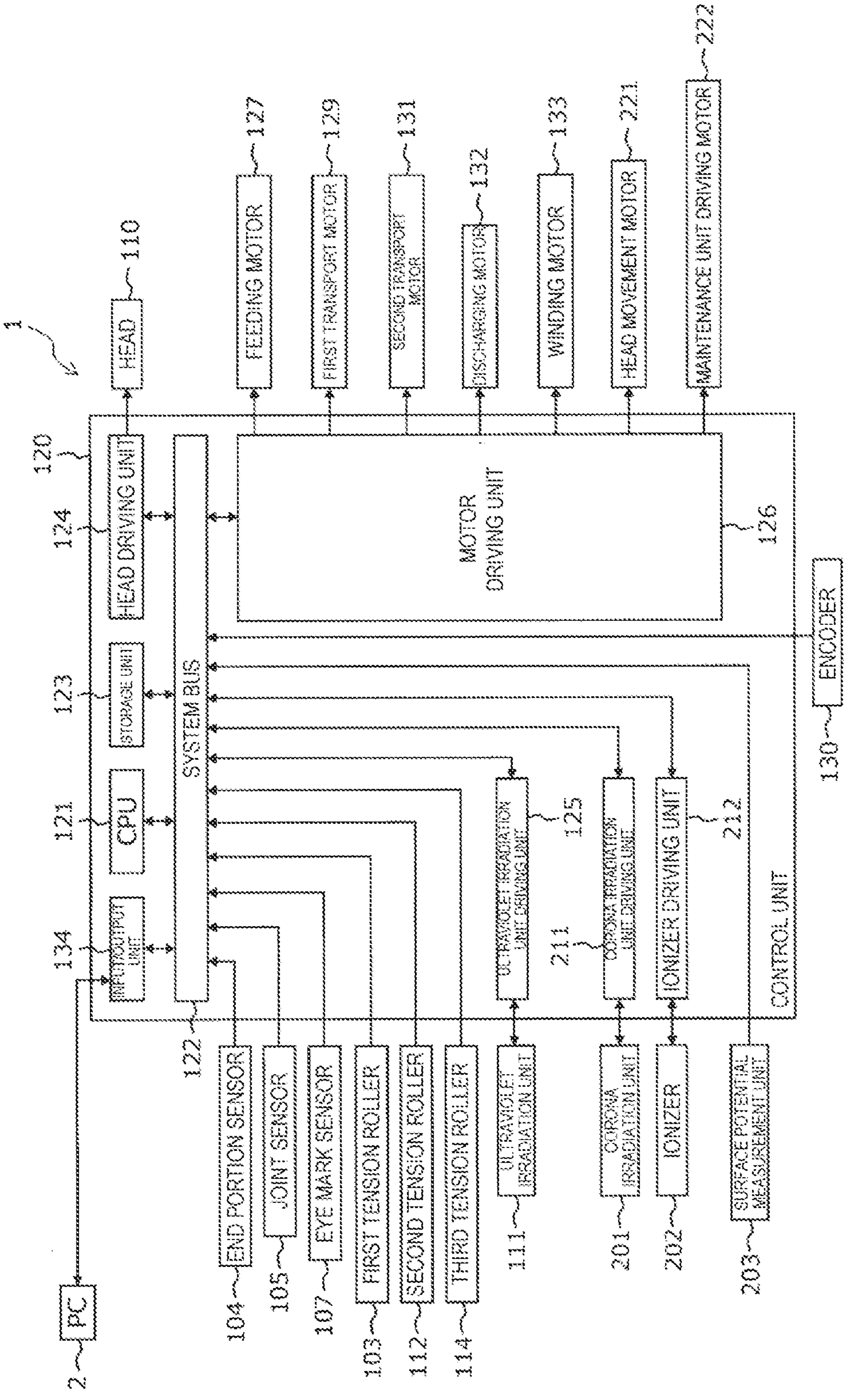
FIG. 2 is a block diagram illustrating an electrical configuration of the recording device in FIG. 1.

Embodiments of the present disclosure will be described below with reference to the accompanying drawings. First, an overview of a recording device 1 according to a working example of the present disclosure will be described with reference to FIG. 1 and FIG. 2. The recording device 1 of the present working example is a recording device that forms an image on a target recording medium M such as a film made of paper, cloth, and resin, and is communicatively coupled to a PC2 as illustrated in FIG. 2. Note that, as illustrated in FIG. 1, the recording device 1 of the present working example is configured to be capable of performing recording on the target recording medium M wound in a roll shape. However, the present disclosure is not limited to the configuration in which such a target recording medium can be used, and for example, a configuration may be adopted in which a target recording medium having a shape obtained by alternately folding an elongated target recording medium can be used, or the like.

As illustrated in FIG. 1, the recording device 1 of the present working example includes a feeding unit 101 capable of rotating to feed the target recording medium M while the roll-shaped target recording medium M is set. By the feeding unit 101, the target recording medium M is fed to a first driving roller 106 via a driven roller 102 and a first tension roller 103. Then, the target recording medium M is transported in a transport direction A by the first driving roller 106. Here, being driven means being moved in association with movement of the target recording medium M in contact.

In a vicinity of the driven roller 102, a corona irradiation unit 201 is provided that applies corona discharge to the target recording medium M being transported. By applying corona discharge to a surface of the target recording medium M, the surface of the target recording medium M is modified, and recording quality is improved.

Tension of the target recording medium M being fed from the feeding unit 101 is detected by the first tension roller 103, and torque of a feeding motor 127 illustrated in FIG. 2 is controlled by a control unit 120. An end portion sensor 104 that detects an end portion of the target recording medium M, and a joint sensor 105 that detects a joint of the target recording medium M are provided between the first tension roller 103 and the first driving roller 106. When the target recording medium M is transported while meandering, based on a detection result of the end portion sensor 104, the control unit 120 performs control to correct the meandering transportation by causing the feeding unit 101 and the first tension roller 103 to interlock.

In addition, an ionizer 202 that irradiates with an ion is provided between the first tension roller 103 and the first driving roller 106. The surface of the target recording medium M may be charged when the target recording medium M is pulled out and peeled off from a roll-shaped portion, but the surface of the target recording medium M can be destaticized by irradiating, from the ionizer 202, the surface of the target recording medium M with an ion that has a charge opposite to that of an ion charged on the surface of the target recording medium M.

A driven roller 108 is provided downstream of the first driving roller 106 in the transport direction A, and further, a driven drum 109 serving as a support portion of the target recording medium M is provided downstream of in the transport direction A. Between the first driving roller 106 and the driven roller 108, an eye mark sensor 107 is provided that detects an eye mark recorded on the target recording medium M. Here, the eye mark is a mark used in controlling recording timing when recording is temporarily stopped and subsequently restarted, when recording is further performed following previous recording, or the like. Note that, the eye mark may be recorded on the target recording medium M along with an image by a head 110 as an ejecting unit, or may be recorded on the target recording medium M in advance.

A plurality of the heads 110 as an ejecting unit for ejecting ink, and a plurality of ultraviolet irradiation units 111 are provided at positions facing the driven drum 109. Since an ultraviolet curable ink that is cured by being irradiated with ultraviolet rays is used for all the inks, the recording device 1 of the present working example is provided with the ultraviolet irradiation unit 111 for curing the ink. Further, the recording device 1 of the present working example includes, as the heads 110, seven among the heads 110 including a head 110*a* and a head 110*b* for ejecting a white ink for forming a background image, a head 110*c*, a head 110*d*, a head 110*e*, and a head 110*f* for ejecting colored inks for forming a colored image, and a head 110*g* for ejecting a post-processing ink, and includes, as the ultraviolet irradiation units 111, three among the ultraviolet irradiation units 111 including an ultraviolet irradiation unit 111*a*, an ultraviolet irradiation unit 111*b*, and an ultraviolet irradiation unit 111*c*. However, there is no particular limitation on the number or an arrangement of the heads 110 and the ultraviolet irradiation units 111.

At positions facing the heads 110 and the ultraviolet irradiation units 111, the target recording medium M is transported while being wound around the driven drum 109. The driven drum 109 is provided with an encoder 130 as illustrated in FIG. 2, and a rotational speed of the driven drum 109 corresponding to a transport speed of the target recording medium M is detected by the encoder 130, and the control unit 120 controls ejection timing of ink from the head 110 so that a desired image is formed at a desired position of the target medium M. Note that, a transport distance of the target recording medium M is also managed by the control unit 120 based on a detection result of the encoder 130.

A surface potential measurement unit 203 for measuring a potential of the surface of the target recording medium M is provided at a position facing the driven drum 109, the position being upstream of the head 110*a* in the transport direction A. When a measurement result of the surface potential measurement unit 203 is input, the control unit 120 can drive the ionizer 202 as a surface potential adjustment unit that adjusts the surface potential, which is the potential of the surface of the target recording medium M, to be within a desired range, in accordance with the measurement result.

A second driving roller 113 is provided downstream of the driven drum 109 in the transport direction A via a second tension roller 112. Tension in the transport direction A applied to the target recording medium M in a state of wound around the driven drum 109 is detected by the second tension roller 112, and is set to desired tension, by the control unit 120 controlling torque of a second transport motor 131 illustrated in FIG. 2, which is a driving motor of the second driving roller 113, based on a detection result in the second tension roller 112.

A third tension roller 114, a driven roller 115, and a driven roller 116 are disposed in order, downstream of the second driving roller 113 in the transport direction A. Then, a winding unit 118 is provided downstream of the driven roller 116 in the transport direction A. The winding unit 118 is capable of rotating to wind the target recording medium M in a roll shape. Tension applied to the winding unit 118 is detectable by the third tension roller 114, and is set to desired tension by the control unit 120 controlling torque of a winding motor 133 illustrated in FIG. 2, which is a driving motor of the winding unit 118, based on a detection result of the third tension roller 114. Note that, the tension can be changed in accordance with a winding diameter of the target recording medium M wound around the winding unit 118.

Next, an electrical configuration of the recording device 1 of the working example will be described using FIG. 2. The recording device 1 of the present working example is coupled to the PC 2, and has a configuration in which the control unit 120 is provided inside the recording device 1, but the present disclosure is not limited to such a configuration. For example, the PC 2 coupled to the recording device 1 may be configured to play at least a part of a role of the control unit of the recording device 1.

The control unit 120 includes a CPU 121 that manages control of the entire recording device 1. The CPU 121 is coupled through a system bus 122 to a storage unit 123 that includes a ROM that stores various types of control programs and the like to be executed by the CPU 121, and a RAM and an EEPROM that can temporarily store data. The storage unit 123 stores a predetermined type target recording medium, which is a specific target recording medium of the recording media M that can be used in the recording device 1 of the present working example, and stores data on conditions under which irradiation with an ion is performed from the ionizer 202, in accordance with the predetermined type target recording medium and corona illuminance by the corona irradiation unit 201.

Furthermore, the CPU 121 is coupled through the system bus 122 to a head driving unit 124 for driving each head 110 to eject ink. Additionally, the CPU 121 is coupled through the system bus 122 to the ultraviolet irradiation unit driving unit 125 for driving the ultraviolet irradiation unit 111 to irradiate with ultraviolet light.

In addition, the CPU 121 is coupled through the system bus 122 to a corona irradiation unit driving unit 211 for driving the corona irradiation unit 201 to apply corona discharge. In addition, the CPU 121 is coupled through the system bus 122 to an ionizer driving unit 212 for driving the ionizer 202 to irradiate with an ion.

Additionally, the CPU 121 is coupled through the system bus 122 to a motor driving unit 126, which is coupled to a feeding motor 127, a first transport motor 129, a second transport motor 131, a discharging motor 132, a winding motor 133, a head movement motor 221, and a maintenance unit driving motor 222. Here, the feeding motor 127 is a driving motor of the feeding unit 101. Further, the first transport motor 129 is a driving motor of the first driving roller 106. Further, the second transport motor 131 is a driving motor of the second driving roller 113. Further, the discharging motor 132 is a driving motor of a discharging roller 117. Further, the winding motor 133 is a driving motor of the winding unit 118. Further, the head movement motor 221 is a driving motor constituting an interval adjustment unit for changing an interval between the head 110 and the driven drum 109, that is, an interval PG (paper gap) between the head 110 and the target recording medium M by moving the head 110. Then, the maintenance unit driving motor 222 is a driving motor of a wiper and a suction cap (not illustrated) capable of maintaining the head 110, and constitutes the maintenance unit together with the wiper and the suction cap. Note that, by performing the maintenance of the head 110, an adhesive adhering to a nozzle of the head 110 is removed, and an amount of radicals present in the head 110 decreases.

Further, the CPU 121 is coupled to the end portion sensor 104, the joint sensor 105, the eye mark sensor 107, and the surface potential measurement unit 203 via the system bus 122. Further, the CPU 121 is coupled through the system bus 122 to the first tension roller 103, the second tension roller 112, and the third tension roller 114. In addition, the CPU 121 is coupled through the system bus 122 to the encoder 130. Furthermore, the CPU 121 is coupled through the system bus 122 to the PC 2 for receiving and transmitting data such as image data and signals through an input-output unit 134.

Next, an example of a method of controlling an ionizer as a surface potential adjustment unit of each of an existing recording device and the recording device 1 of the above present working example that performs recording on the roll-shaped target recording medium M will be described with reference to FIG. 3. In each of the existing recording device and the recording device 1 of the above working example that performs recording on the roll-shaped target recording medium M, as illustrated in a leftmost state diagram in FIG. 3, when the target recording medium M is peeled from a roll, a back surface Mb, which is an inner surface, is charged to have a negative potential, and a front surface Ma on a side opposite to the back surface Mb is charged to have a positive potential.

Figure 3:
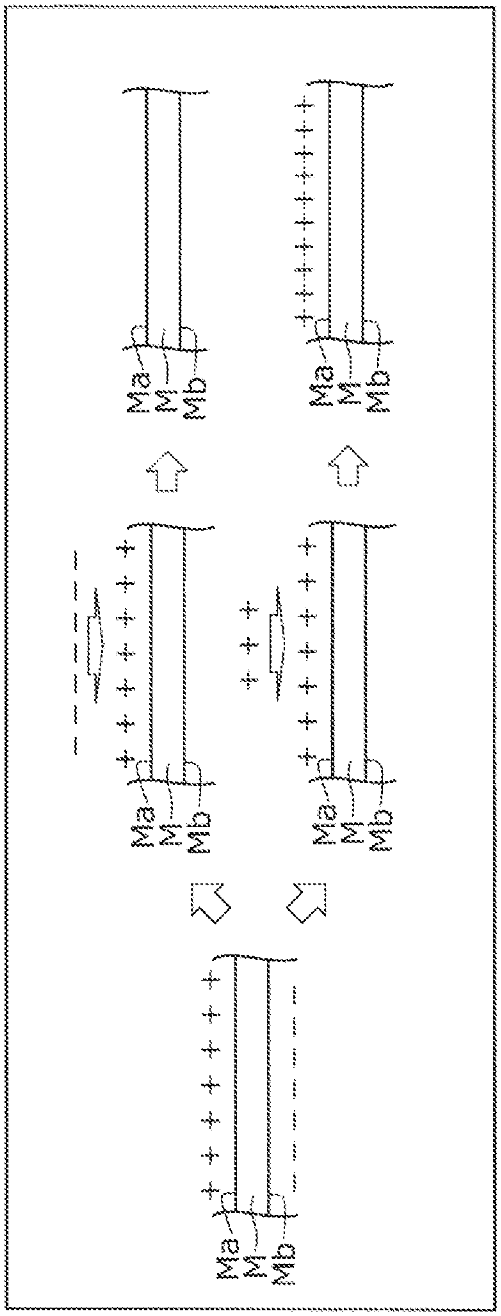
FIG. 3 is a schematic diagram for explaining a control method of a surface potential adjustment unit of each of an existing recording device and a recording device in FIG. 1.

In the existing recording device that performs recording on the roll-shaped target recording medium M, as illustrated in a second upper left state diagram in FIG. 3, the front surface Ma is irradiated with an appropriate amount of negative ions to neutralize the positive potential of the front surface Ma from the ionizer, in order to neutralize the positive potential of the surface Ma. As a result, as illustrated in an upper rightmost state diagram in FIG. 3, the front surface Ma is brought into a substantially non-charged state, and ink is ejected from the head 110 onto the target recording medium M in such a charged state to perform recording. In this manner, in the existing recording device, by irradiating with an ion from the ionizer before performing recording, driving of the ionizer is controlled such that the front surface Ma is brought into a substantially non-charged state.

On the other hand, in the recording device 1 of the present working example, as illustrated in a second lower left state diagram in FIG. 3, the front surface Ma is irradiated with, for example, a positive ion from the ionizer in order to charge the front surface Ma to have a positive potential within a predetermined range. As a result, as illustrated in a lower rightmost state diagram in FIG. 3, the front surface Ma is brought into a positively charged state within the predetermined range, and ink is ejected from the head 110 onto the target recording medium M in such a charged state to perform recording. In this manner, in the recording device 1 of the present working example, by spraying with an ion from the ionizer 202 before performing recording, driving of the ionizer 202 is controlled such that the front surface Ma is brought into a charged state at a positive potential in the predetermined range. Note that, when the positive potential of the front surface Ma reaches or exceeds the predetermined range in the case of the leftmost state diagram in FIG. 3, an ion is not sprayed from the ionizer 202, or a negative ion is sprayed from the ionizer 202, in some cases.

In the recording device 1 of the present working example, various types of the target recording media M can be used. In the existing recording device, particularly when the target recording medium M was used, which is made of resin, and is made of polyethylene terephthalate, there were many ink ejection failures. It is conceivable that this is due to a large amount of radicals generated by corona treatment, when the target recording medium M made of polyethylene terephthalate is used. Therefore, next, a radical generation mechanism with the corona treatment when the target recording medium M made of polyethylene terephthalate is used will be described using FIG. 4.

Figure 4:
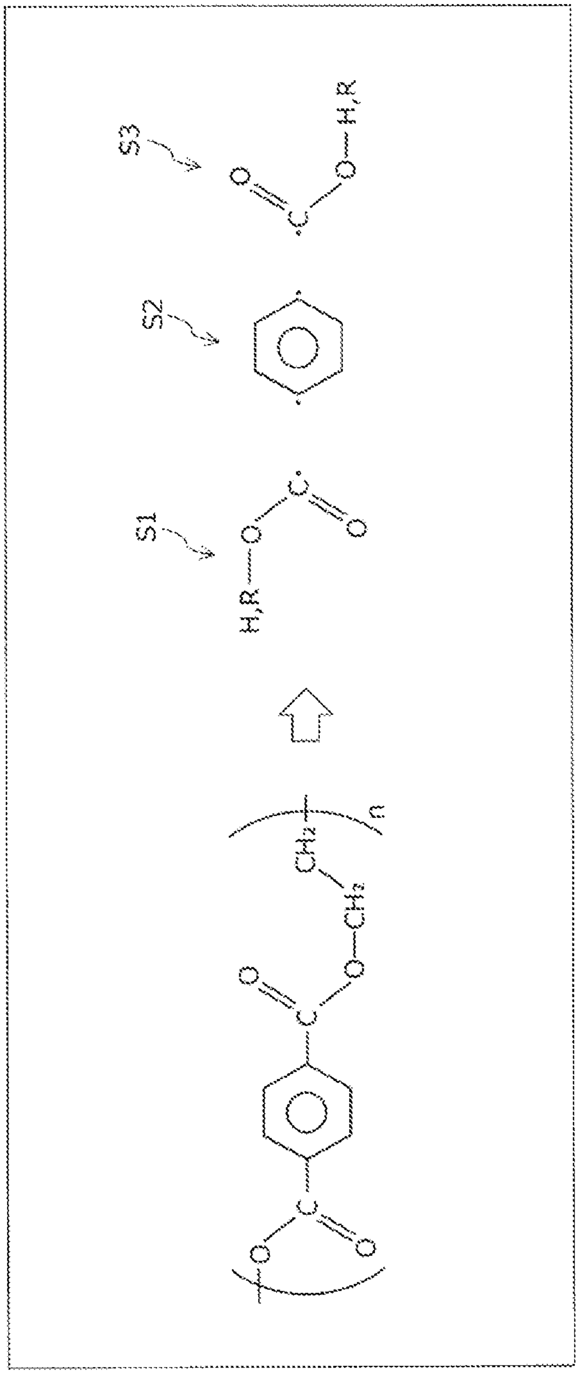
FIG. 4 is a diagram for explaining a radical generation mechanism by corona treatment when a target recording medium made of polyethylene terephthalate is used.

As illustrated in a left structural formula in FIG. 4, polyethylene terephthalate has structure in which a structure having respective carbonyl groups on both sides of a benzene ring, and a plurality of that structures are linked. Here, when the corona irradiation unit 201 applies corona discharge to polyethylene terephthalate in the corona treatment, as illustrated by a right structural formula in FIG. 4, the benzene ring and the carbonyl group are cleaved, and radicals are formed as illustrated by a compound S1, a compound S2, and a compound S3. Here, a reference sign R in the figure represents alkyl groups of various types of structure.

Some of the radicals generated in this manner form oxalic acid, oxalic acid-like compounds, and the like, but those that remain as the radicals may react with ink. Since the radical may play a role of a polymerization initiator for an ultraviolet curable ink, the radical thus generated may react with ink in a vicinity of a nozzle of the head 110 and the like and cause an ejection failure.

Next, a mechanism where ink adheres to a vicinity of the nozzle of the head 110 will be described using FIG. 5 and FIG. 6. The head 110 of the recording device 1 of the present working example includes a nozzle N, and a piezoelectric element (not illustrated) that pushes ink of the nozzle N. Here, FIG. 5 is a graph illustrating a waveform example of voltage applied to the piezoelectric element, and FIG. 6 is a schematic diagram illustrating a state in the vicinity of the nozzle N corresponding to the waveform example in FIG. 5.

Figure 5:
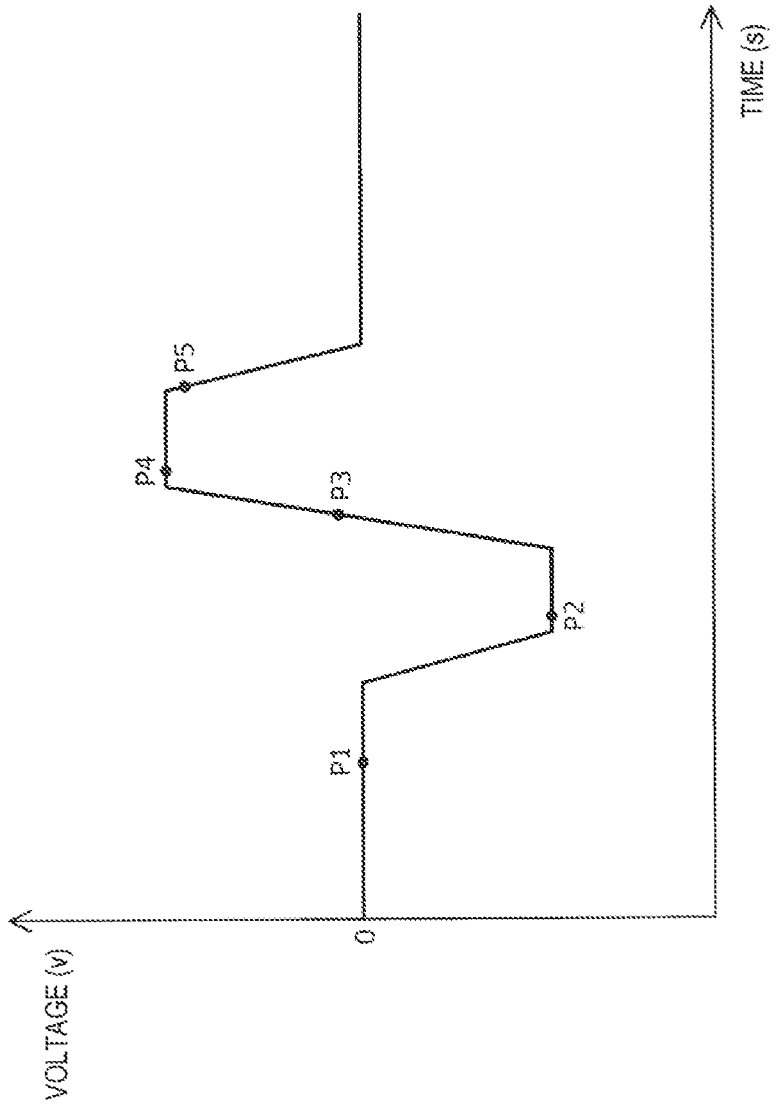
FIG. 5 is a graph showing a waveform example of voltage applied to a piezoelectric element.

As illustrated in FIG. 5, when ink I is ejected from the nozzle N, in a state in which voltage application is stopped, a negative voltage is first applied to the piezoelectric element. Then, subsequently, a positive voltage is applied to the piezoelectric element. And again, the voltage application is stopped. The waveform in FIG. 5 is a waveform corresponding to ejection of the ink I for one dot.

Figure 6:
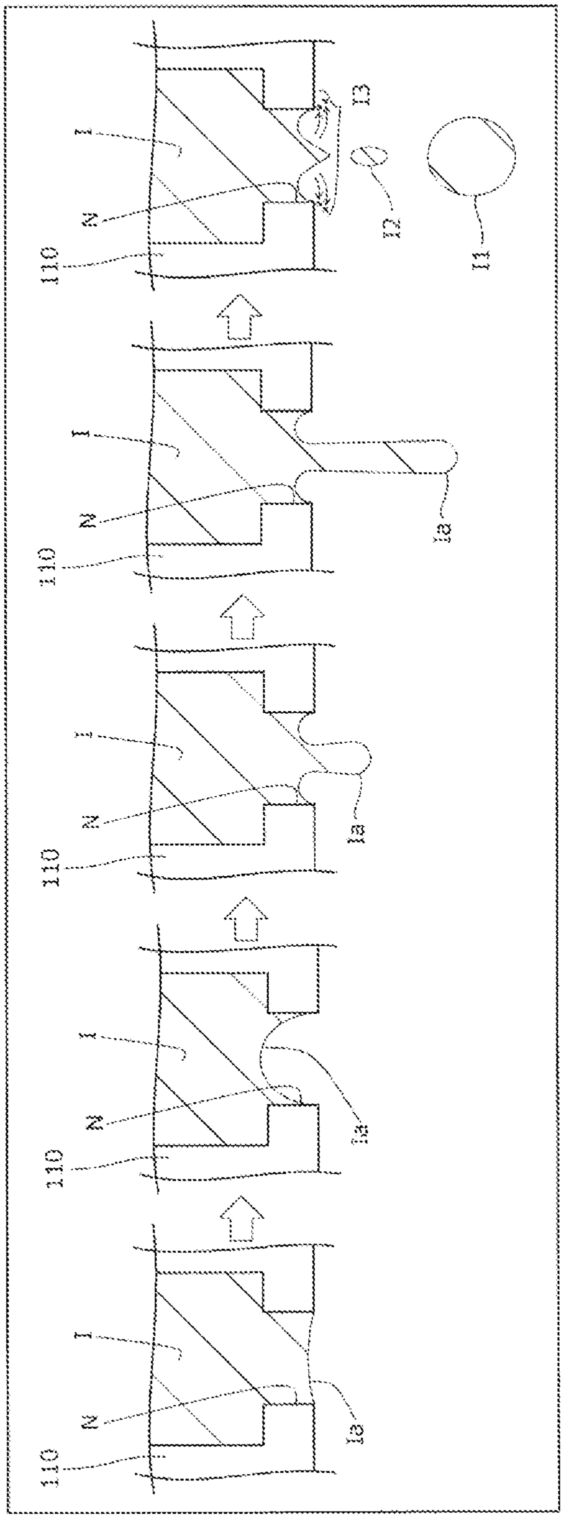
FIG. 6 is a schematic diagram illustrating states in a vicinity of a nozzle corresponding to the waveform example in FIG. 5.

A leftmost state diagram in FIG. 6 illustrates a state corresponding to a position P1 of the waveform in FIG. 5 in which the voltage application to the piezoelectric element is stopped. In the leftmost state diagram in FIG. 6, an interface Ia of the ink I in the nozzle N forms a meniscus that is recessed inward.

A second left state diagram in FIG. 6 illustrates a state corresponding to a position P2 of the waveform in FIG. 5 in which a negative voltage is applied to the piezoelectric element. Applying a negative voltage to the piezoelectric element causes the piezoelectric element to be displaced to give a negative pressure to the ink I in the nozzle N. As illustrated in the second left state diagram in FIG. 6, by displacing the piezoelectric element to provide a negative pressure to the ink I in the nozzle N, the interface Ia of the ink I in the nozzle N is greatly recessed inward.

A third left state diagram in FIG. 6 illustrates a halfway state corresponding to a position P3 of the waveform of FIG.

5 in which a positive voltage is applied to the piezoelectric element so that the voltage changes from negative to positive. In such a voltage application state, the piezoelectric element is displaced so as to apply a positive pressure to the ink I in the nozzle N. As illustrated in the third left state diagram in FIG. 6, by displacing the piezoelectric element to provide a positive pressure to the ink I in the nozzle N, the interface Ia of the ink I in the nozzle N greatly protrudes outward at a central part of the nozzle N.

A fourth left state diagram in FIG. 6 illustrates a state corresponding to a position P4 of the waveform in FIG. 5 in which a positive voltage is applied to the piezoelectric element. As illustrated in the fourth left state diagram in FIG. 6, as compared to the third left state diagram in FIG. 6, by displacing the piezoelectric element to further provide a positive pressure to the ink I in the nozzle N, the interface Ia of the ink I in the nozzle N further greatly protrudes outward at the central part of the nozzle N.

A rightmost state diagram in FIG. 6 illustrates a state corresponding to a position P5 of the waveform in FIG. 5 in which the voltage applied to the piezoelectric element changes from positive toward zero. As illustrated in the rightmost state diagram in FIG. 6, the ink I that protrudes greatly outward in the fourth left state diagram in FIG. 6 is separated into a main dot I1 and a satellite dot I2 and minute ink mist I3. Here, when the head 110 is coupled to the ground (GND), it is conceivable that the main dot I1 is negatively charged, and the satellite dot I2 is positively charged, and the minute ink mist I3 is negatively charged. Since the main dot I1 and the satellite dot I2 each have a large weight, and large ejection energy associated with being ejected from the nozzle N, substantially all of the main dot I1 and a large part of the satellite dot I2 land on the front surface Ma of the target recording medium M. On the other hand, since the minute ink mist I3 has a small weight, and small ejection energy, the ink mist I3 becomes floating mist, or adheres to a vicinity of the nozzle N, in some cases. That is, it is conceivable that adhesion of the ink I to the vicinity of the nozzle N of the head 110 is caused by the ink mist I3 generated in association with ejection of the ink I from the nozzle N.

Figure 7:
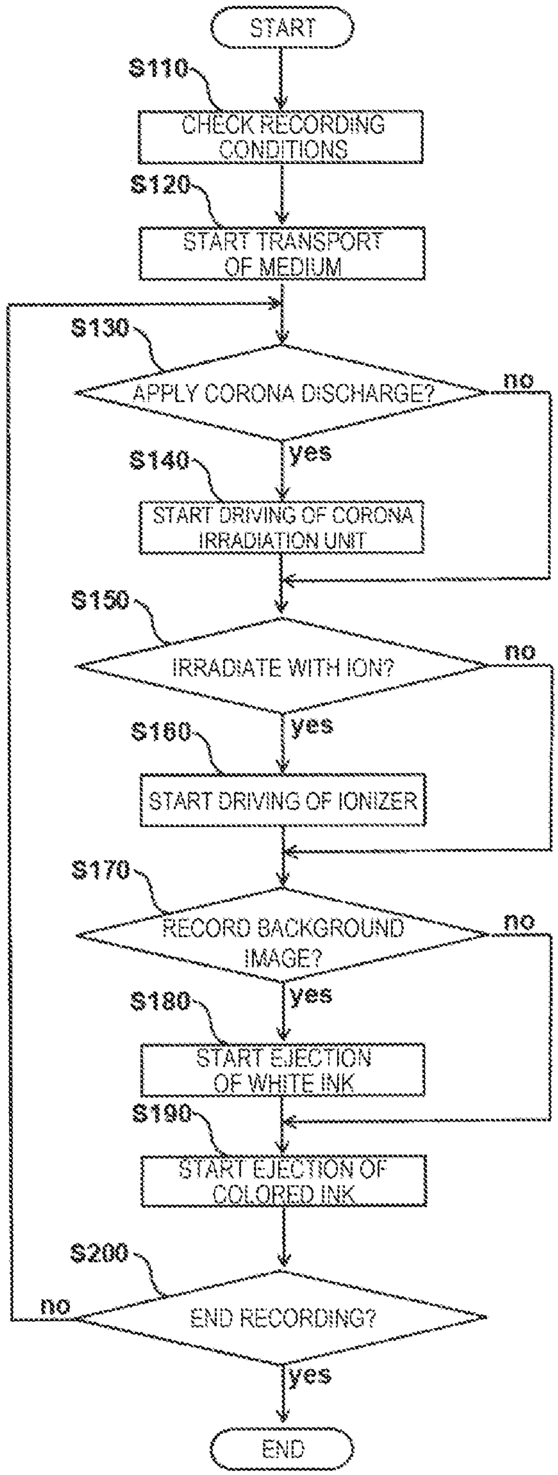
FIG. 7 is a flowchart of a recording method according to a working example performed using the recording device in FIG. 1.

Next, a working example of a recording method that can be performed in the above recording device 1 will be described using FIG. 7. For example, when recorded data is input from the PC2 and the like, and the recording method of the present working example is started, the control unit 120 first checks recording conditions from the recorded data in step S110, as illustrated in FIG. 7. The checking of the recording conditions is, for example, checking of a type of the target recording medium M, whether a background image is to be recorded or not, and the like. Here, the checking of the type of the target recording medium M includes checking of whether to perform recording on a predetermined type target recording medium stored in the storage unit 123 or not, checking of an ion irradiation condition from the specific ionizer 202 when recording is performed on the predetermined type target recording medium, and the like.

When the recording conditions are checked in step S110, transport of the target recording medium M is started in step S120. Then, in step S130, the control unit 120 determines whether to apply corona discharge to a desired position of the target recording medium M by the corona irradiation unit 201, or not. The determination of whether to apply corona discharge or not is performed based on contents of the recorded data checked in step S110. When it is determined in step S130 to apply corona discharge, the processing proceeds to step S140, the corona irradiation unit 201 applies corona discharge to a desired position of the target recording medium M, and then the processing proceeds to step S150. On the other hand, when it is determined not to apply corona discharge in step S130, the processing proceeds to step S150 without proceeding to step S140.

In step S150, in the control unit 120, it is determined whether to irradiate a desired position of the target recording medium M with an ion from the ionizer 202 or not, and when irradiation with an ion is to be performed, whether the target recording medium M is the predetermined type target recording medium or not, and under what conditions irradiation with an ion is to be performed. The determination of whether to irradiate with an ion or not is performed based on the contents of the recorded data checked in step S110. In addition, the determination under what conditions irradiation with an ion is to be performed can be performed by first determining whether the target recording medium M is the predetermined type target recording medium or not, and when the target recording medium M is the predetermined type target recording medium, the determination may be performed based on data stored in the storage unit 123 or a measurement result of the surface potential measurement unit 203. Here, the data stored in the storage unit 123 is data corresponding to a relationship between the predetermined type target recording medium and corona illuminance from the corona irradiation unit 201. In any case, in the case of the predetermined type target recording medium, the control unit 120 controls driving of the ionizer 202 such that the surface potential being a potential of the front surface Ma of the target recording medium M is a positive potential within a predetermined range.

Figure 8:
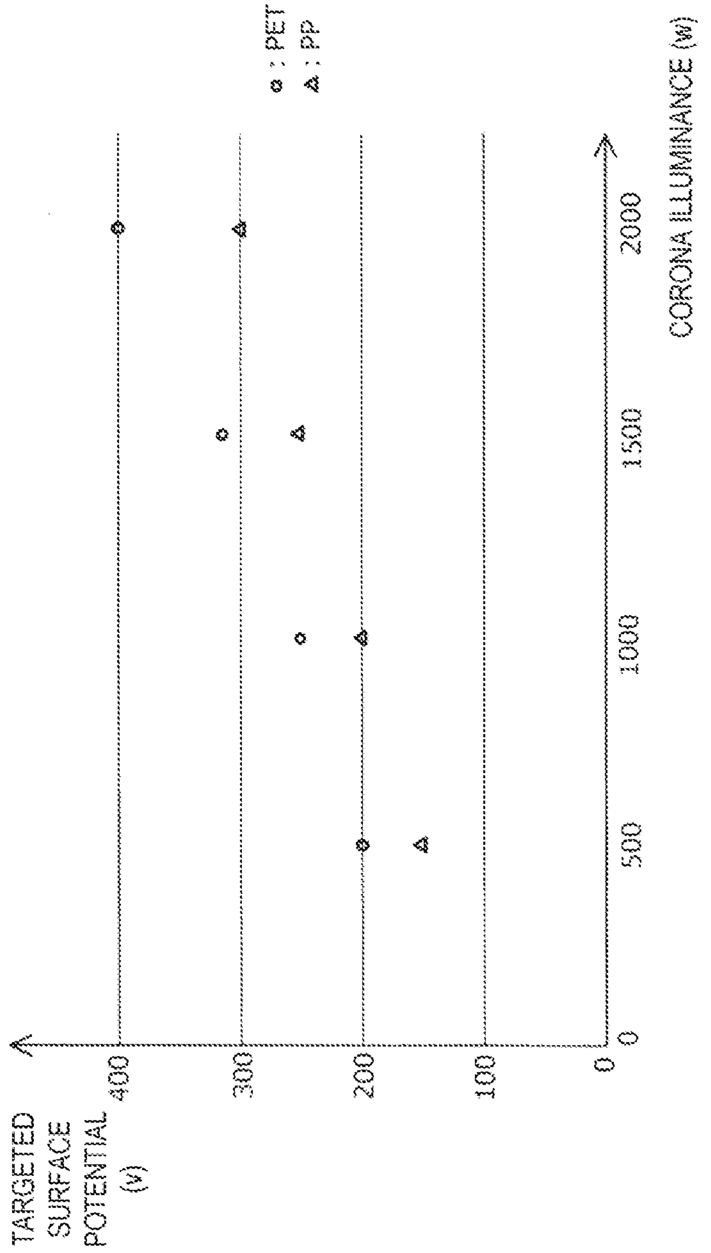
FIG. 8 is a graph showing a relationship between corona illuminance and targeted surface potential.

FIG. 8 shows a relationship, when polyethylene terephthalate (PET) and polypropylene (PP) are used as the recording medium M, which is a predetermined type target recording medium, corresponding to data stored in the storage unit 123, between corona illuminance from the corona irradiation unit 201, and a surface potential of the targeted target recording medium M after adjustment by the ionizer 202. In the present working example, for example, irradiation with an ion is performed such that the surface potential is from 150 v to 400 v. When polyethylene terephthalate (PET) and polypropylene (PP) are used as the recording medium M, the value is affected by transport velocity of the target recording medium M and changes, but the surface potential of the recording medium M before irradiation with an ion from the ionizer 202 is performed is approximately from 0 to 50 v. For this reason, for example, when polyethylene terephthalate is used as the target recording medium M, the surface potential of the target recording medium M before irradiation with an ion from the ionizer 202 is performed is 50 v, and the corona illuminance is 500 w, irradiation with a positively charged ion from the ionizer 202 is performed such that the surface potential of the target recording medium M is increased by approximately 150 V. Further, for example, when polypropylene is used as the target recording medium M, the surface potential of the target recording medium M before irradiation with an ion from the ionizer 202 is performed is 50 v, and the corona illuminance is 500 w, irradiation with a positively charged ion from the ionizer 202 is performed such that the surface potential of the target recording medium M is increased by approximately 100 v.

Similarly, for example, when polyethylene terephthalate is used as the target recording medium M, the surface potential of the target recording medium M before irradiation with an ion from the ionizer 202 is performed is 50 v, and the corona illuminance is 2000 w, irradiation with a positively charged ion from the ionizer 202 is performed such that the surface potential of the target recording medium M is increased by approximately 350 v. Further, for example, when polypropylene is used as the target recording medium M, the surface potential of the target recording medium M before irradiation with an ion from the ionizer 202 is performed is 50 v, and the corona illuminance is 2000 w, irradiation with a positively charged ion from the ionizer 202 is performed such that the surface potential of the target recording medium M is increased by approximately 250 v.

When it is determined to irradiate with an ion in step S150, the processing proceeds to step S160, and a desired position of the target recording medium M is irradiated with an ion from the ionizer 202, and then the processing proceeds to step S170. On the other hand, when it is determined not to irradiate with an ion in step S150, the processing proceeds to step S170 without proceeding to step S160.

In step S170, the control unit 120 determines whether to record a background image at a desired position of the target recording medium M, or not. The determination of whether to record the background image or not is performed based on the contents of the recorded data checked in step S110. When it is determined to record the background image in step S170, the processing proceeds to step S180, and white inks are ejected from the head 110*a* and the head 110*b* at a desired position of the target recording medium M to form the background image, and then the processing proceeds to step S190. On the other hand, when it is determined not to record the background image in step S170, the processing proceeds to step S190 without proceeding to step S180.

In step S190, a colored image is recorded at a desired position of the target recording medium M. Here, when the background image is recorded in step S180, the colored image is recorded at the position where the background image is formed. The recording of the colored image is performed by ejecting a black ink, a cyan ink, a magenta ink, and a yellow ink as the colored inks from the head 110*c*, the head 110*d*, the heads 110*e* and the head 110*f*, and ejecting a post-processing ink from the head 110*g* as necessary. In addition, in step S180 and step S190, ultraviolet radiation from each ultraviolet irradiation unit 111 is also performed in accordance with ejection of each ink from each head.

After step S190 ends, the processing proceeds to step S200, and the control unit 120 determines whether all of the input recorded data is recorded or not. When it is determined that all of the input recorded data is recorded, the recording method of the present working example ends. On the other hand, when it is determined that all of the input recorded data is not recorded, then the processing returns to step S130, and then step S130 to step S190 are repeated until it is determined that all of the input recorded data is recorded.

Here, once the recording device 1 of the present working example is summarized, the recording device 1 of the present working example includes the first driving roller 106 and the second driving roller 113 as the transport unit for transporting the target recording medium M, the corona irradiation unit 201 disposed in the transport path of the target recording medium M, and applying corona discharge to the front surface Ma of the target recording medium M to modify the front surface Ma, the head 110 as the ejecting unit disposed downstream of the corona irradiation unit 201 in the transport path of the target recording medium M, and ejecting the ultraviolet curable ink I onto the front surface Ma, the ionizer 202 as the surface potential adjustment unit disposed between the corona irradiation unit 201 and the head 110 in the transport path of the target recording medium M, and adjusting the surface potential being the potential of the front surface Ma, the control unit 120 controlling driving of the first driving roller 106, the second driving roller 113, the corona irradiation unit 201, the head 110, and the ionizer 202, and the storage unit 123 storing the predetermined type target recording medium being the predetermined type of the target recording medium M. Then, the control unit 120 controls the driving of the ionizer 202 such that the surface potential is a positive potential in the predetermined range when recording is performed on the predetermined type target recording medium stored in the storage unit 123.

When another expression is used, the recording device 1 of the present working example can be used to perform a recording method for driving the ionizer 202 such that the surface potential is a positive potential in the predetermined range when recording is performed on the predetermined type target recording medium stored in the storage unit 123. In this way, when recording is performed on the predetermined type target recording medium, the surface potential adjustment unit is driven so that the surface potential is a positive potential within the predetermined range, so even when the minute ink mist I3 is generated in association with ejection of the ink I, the ink mist I3 can be easily attracted by and heading to the front surface Ma of the target recording medium M, that is, the ink mist I3 can be made unlikely to adhere to the head 110. Thus, the recording device 1 of the present working example can suppress occurrence of an ejection failure of the ink I caused by reaction of a radical generated by applying corona discharge to the surface Ma of the target recording medium M by the corona irradiation unit 201 with the ink I adhering to the head 110.

Further, as described above, the storage unit 123 stores the associated data corresponding to the predetermined type target recording medium so that the surface potential is a positive potential within the predetermined range. Then, the control unit 120 can control the driving of the ionizer 202 based on the data. Thus, the recording device 1 of the present working example can easily set the surface potential to a positive potential within the predetermined range based on the data.

On the other hand, as described above, the recording device 1 of the working example includes the surface potential measurement unit 203 that measures the surface potential, and the control unit 120 can control the driving of the ionizer 202 based on a measurement result of the surface potential measurement unit 203. Thus, the recording device 1 of the present working example can precisely set the surface potential to a positive potential within the predetermined range, based on the measurement result of the surface potential measurement unit 203.

Further, as described above, the recording device 1 of the present working example includes the driven drum 109 that is the rotating body that rotates while supporting the target recording medium M over a range including a position facing the head 110, and the surface potential measurement unit 203 is disposed at a location facing the driven drum 109, the location being upstream of the head 110 in the transport direction A of the target recording medium M. Therefore, the recording device 1 of the present working example can measure the surface potential immediately before the ink is ejected from the head 110, and, can particularly precisely set the surface potential to a positive potential within the predetermined range.

Figure 9:
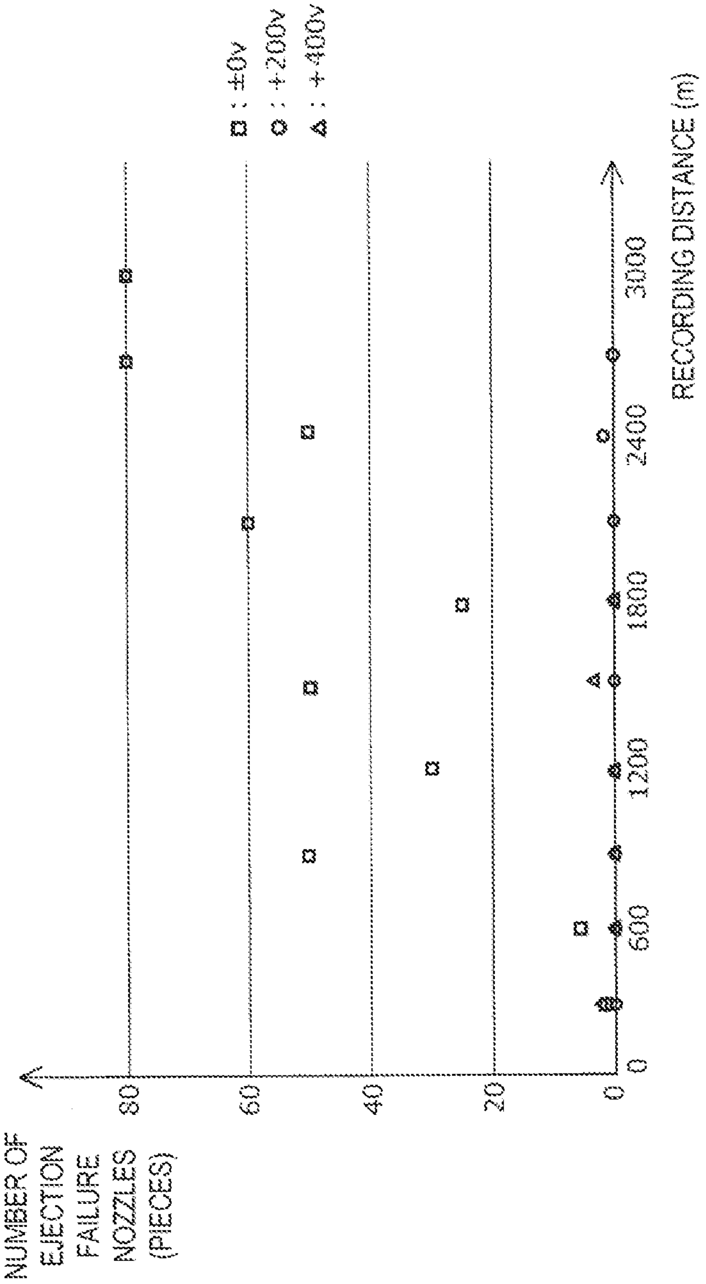
FIG. 9 is a graph showing a relationship between distance along which recording was performed on a target recording medium and the number of nozzles in which minor ejection failures occurred.

Also, as described above, in the recording device 1 of the working example, a positive potential within the predetermined range is from 150 v to 400 v. By setting the surface potential of the target recording medium M to a positive potential in such a range, it is possible to effectively suppress occurrence of an ink ejection failure. FIG. 9 is a graph illustrating an example of a relationship between surface potential of the front surface Ma and the number of ejection failure nozzles when corona illuminance is 500 w and a polyethylene terephthalate film is used as the target recording medium M. Compared to when the surface potential is ±0 V, when the surface potential is +200 V and the surface potential is +400 V, and even when recording is performed continuously, and a recording distance on the target recording medium M is increased, the number of ejection failure nozzles can be significantly suppressed. Note that, although not illustrated in FIG. 9, it has been found that the number of ejection failure nozzles can be significantly suppressed even when the recording distance on the target recording medium M is increased when the surface potential is in a range from +150 v to +400 v, such as the surface potential is +150 v.

Additionally, as described above, the recording device 1 of the present working example includes the maintenance unit including a maintenance unit driving motor 222, a wiper, suction cap, and the like not illustrated, and capable of maintaining the head 110. Then, the control unit 120 can control the maintenance unit to set the maintenance interval by the maintenance unit when recording is performed on the predetermined type target recording medium stored in the storage unit 123 to be shorter than the maintenance interval by the maintenance unit when recording is performed on the target recording medium other than the predetermined type target recording medium.

When the ionizer 202 is driven such that the surface potential is a positive potential within the predetermined range, the positively charged satellite dot I2 adheres to the head 110 and accumulates, and thus the ink I due to the satellite dot I2 may drip on the target recording medium M. However, in the recording device 1 of the present working example, by shortening the maintenance interval under a condition where the satellite dot I2 positively charged by positively charging the front surface Ma of the target recording medium M is more likely to adhere to the head 110 due to repulsive force, it is possible to reduce the possibility that the ink I due to such a satellite dot I2 is accumulated in the head 110 and drips on the recording medium M. Note that, since the satellite dot I2 has a larger dot diameter than that of the minute ink mist I3, when the satellite dot I2 adheres to the head 110, the ink I adhering to the head 110 is more likely to drip on the target recording medium M compared to a case where the ink mist I3 adheres to the head 110.

Here, in the present working example, the predetermined type target recording medium is a target recording medium made of resin containing resin as a material. Peel charging is likely to occur in the target recording medium made of resin, and the front surface Ma is likely to be charged, but it is possible to effectively suppress occurrence of an ejection failure of the ink I even when the target recording medium made of resin is used, by using the target recording medium made of resin as the predetermined type target recording medium.

Here, as the predetermined type target recording medium, those containing at least one of polyethylene terephthalate, polyethylene, and polypropylene as a material may be stored in the storage unit 123. This is because, in the target recording medium M containing at least any one of polyethylene terephthalate, polyethylene, and polypropylene as a material, peel charging is particularly easily occurs, and particularly the front surface Ma is easily charged, but by using the target recording medium M containing at least any one of polyethylene terephthalate, polyethylene, and polypropylene as a material as the target recording medium made of resin, it is possible to effectively suppress occurrence of an ink ejection failure even when the target recording medium M is used.

the present disclosure is not limited to the present embodiments described above, and can be realized in various configurations without departing from the gist of the present disclosure. For example, appropriate replacements or combinations may be made to the technical features in the present embodiments which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A recording device, comprising:

a transport unit configured to transport a target recording medium;

a corona irradiation unit disposed in a transport path of the target recording medium, and configured to apply corona discharge to a surface of the target recording medium to modify the surface;

an ejecting unit disposed downstream of the corona irradiation unit in the transport path, and configured to eject an ultraviolet curable ink onto the surface;

a surface potential adjustment unit disposed between the corona irradiation unit and the ejecting unit in the transport path, and configured to adjust a surface potential being a potential of the surface;

a control unit configured to control driving of the transport unit, the corona irradiation unit, the ejecting unit, and the surface potential adjustment unit; and a storage unit configured to store a predetermined type target recording medium being a predetermined type of the target recording medium, wherein the control unit, when recording is performed on the predetermined type target recording medium stored in the storage unit, controls driving of the surface potential adjustment unit such that the surface potential is a positive potential within a predetermined range.

2. The recording device according to claim 1, comprising:

a surface potential measurement unit configured to measure the surface potential, wherein the control unit controls driving of the surface potential adjustment unit based on a result of the measurement by the surface potential measurement unit.

3. The recording device according to claim 2, comprising:

a rotating body configured to rotate while supporting the target recording medium over a range including a position facing the ejecting unit, wherein the surface potential measurement unit is disposed at a position facing the rotating body, the position being upstream of the ejecting unit in a transport direction of the target recording medium.

4. The recording device according to claim 1, wherein the storage unit stores data correspondingly associated with the predetermined type target recording medium so that the surface potential is a positive potential within the predetermined range, and the control unit controls driving of the surface potential adjustment unit based on the data.

5. The recording device according to claim 1, wherein a positive potential within the predetermined range is from 150 v to 400 v.

6. The recording device according to claim 1, comprising:
a maintenance unit configured to maintain the ejecting unit, wherein
the control unit controls the maintenance unit to set an interval of maintenance by the maintenance unit when recording is performed on the predetermined type target recording medium stored in the storage unit to be shorter than an interval of maintenance by the maintenance unit when recording is performed on the target recording medium other than the predetermined type target recording medium.

7. The recording device according to claim 1, wherein the predetermined type target recording medium is a resin-made target recording medium containing resin as a material.

8. The recording device according to claim 7, wherein the predetermined type target recording medium contains at least any one of polyethylene terephthalate, polyethylene, and polypropylene as a material.

9. A recording method performable using a recording device, the recording device including:
a transport unit configured to transport a target recording medium;
a corona irradiation unit disposed in a transport path of the target recording medium, and configured to apply corona discharge to a surface of the target recording medium to modify the surface;
an ejecting unit disposed downstream of the corona irradiation unit in the transport path, and configured to eject an ultraviolet curable ink onto the surface;
a surface potential adjustment unit disposed between the corona irradiation unit and the ejecting unit in the transport path, and configured to adjust a surface potential being a potential of the surface; and
a storage unit configured to store a predetermined type target recording medium being a predetermined type of the target recording medium,
the recording method comprising
driving the surface potential adjustment unit such that the surface potential is a positive potential within a predetermined range, when recording is performed on the predetermined type target recording medium stored in the storage unit.

* * * * *